United States Patent

[11] 3,627,903

| [72] | Inventor | Walter A. Plummer<br>Sherman Oaks, Calif. |
|---|---|---|
| [21] | Appl. No. | 76,096 |
| [22] | Filed | Sept. 28, 1970 |
| [45] | Patented | Dec. 14, 1971 |
| [73] | Assignee | Southern Weaving Company<br>Greenville, S.C. |

[54] WOVEN CABLE HARNESS ASSEMBLY AND METHOD OF MAKING SAME
9 Claims, 5 Drawing Figs.

[52] U.S. Cl. ............................................. 174/72 A,
29/628, 174/72 TR, 174/117 F, 174/117 M
[51] Int. Cl. ............................................. H01b 7/08
[50] Field of Search ......................................... 174/71 R,
72 R, 72 A, 72 TR, 117 R, 117 F, 117 FF, 117 M;
29/461, 624, 628; 156/47, 49

[56] References Cited
UNITED STATES PATENTS

| 2,361,374 | 10/1944 | Abbott | 174/117 FF |
| 3,495,025 | 2/1970 | Ross | 174/72 TR X |

*Primary Examiner*—Laramie E. Askin
*Attorney*—Sellers and Brace

ABSTRACT: A wire harness assembly and method of making the same using one or more woven cables and groups of conductors along selected lengths thereof separated therefrom to provide branchout groups of conductors. A hot blade passed between a selective pair of conductors is effective to simultaneously sever the weft filaments of the woven cable and to bond the severed ends of the filaments together and/or to the plastic sheath of adjacent conductors. Cross connection between one or more conductors of different groups is accomplished by severing a selected conductor in each group at a point in the main trunk and interconnecting appropriate ones of the severed ends.

PATENTED DEC 14 1971 3,627,903
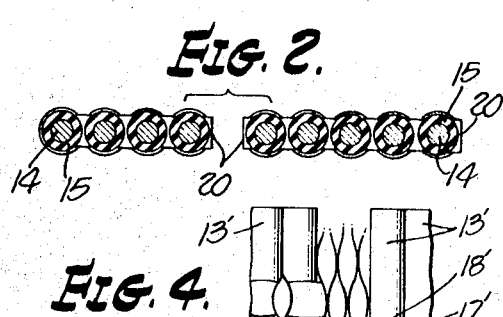
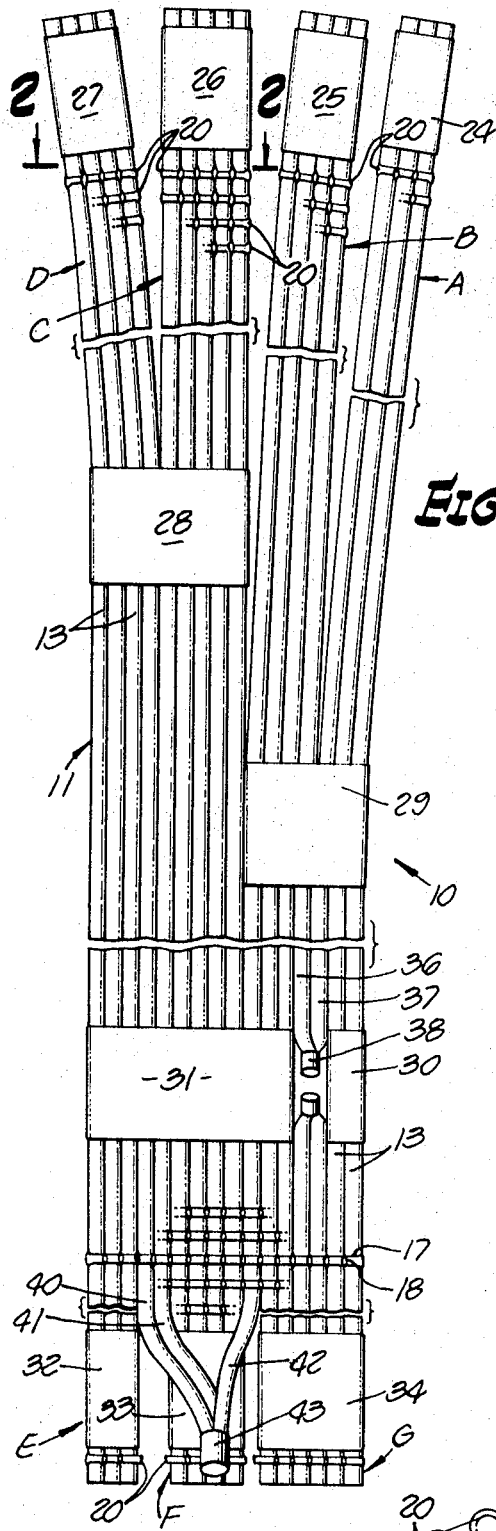
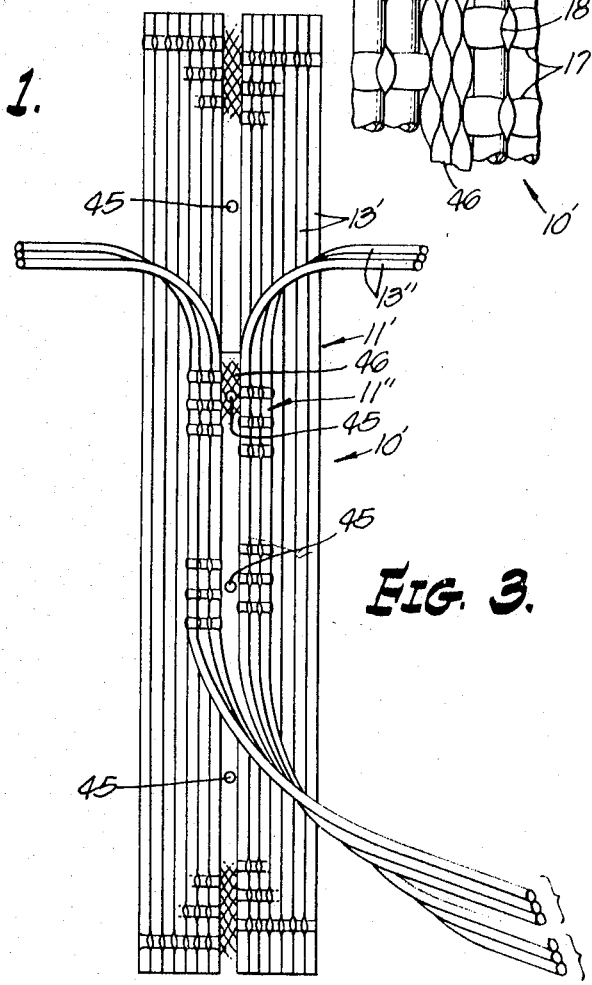
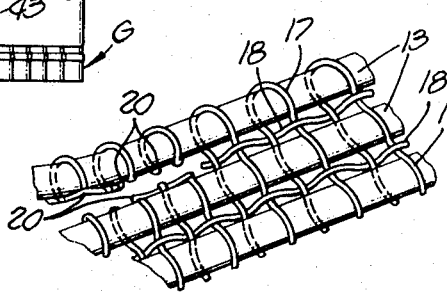
INVENTOR
WALTER A. PLUMMER
BY
ATTORNEYS

WOVEN CABLE HARNESS ASSEMBLY AND METHOD OF MAKING SAME

This invention relates to wire harness assemblies and more particularly to an improved highly versatile harness constructed of one or more woven cable units having selected portions thereof segregated to provide branchout groups of conductors wherever there is need therefor.

Heretofore it has been common practice to construct wire harness assemblies by hand assembling individual conductors along the particular paths required using an assembly jig and thereafter binding the main trunk and branchout conductors with servings of lacing or the like. This is a laborious, time-consuming and costly operation.

By the present invention there is provided a simple, highly versatile technique for constructing custom harness assemblies using mass-produced woven cable units often known as ribbon cables. These cable units comprise a selected number of individual conductors laid side by side and held compactly assembled in flat condition by interweaving the same with suitable weft and warp filaments. Typically, the interweaving filaments are formed of multiple strands of fine thermoplastic material. Likewise, it is customary for the conductor jackets to be formed of extruded thermoplastic composition. Using the principles of this invention, any selected number of woven cable conductors can be segregated from the remainder by the simple expedient of passing a heated blade lengthwise between a pair of conductors separating the two groups. If the rate of movement and temperature of the blade are properly controlled, the weft filaments are not only severed along the selected division line, but their ends are heat fused together and/or to the adjacent surfaces of the conductor jackets. In this manner, groups of branchout conductors are readily separated from the main trunk of the harness and at the same time the severed filaments are firmly and snugly anchored and sealed against unraveling and are as effective to hold the groups of conductors together as they were prior to being severed. By this technique any number and length of branchout groups of conductors can be formed. Greater capacity is readily achieved by securing together two or more woven cables of the same or different sizes. Connection between conductors of different groups is easily achieved by selecting a conductor from each group and interconnecting them at a point transversely of the main trunk of the harness.

Accordingly, it is a primary object of the present invention to provide a low-cost, highly versatile and flexible harness assembly having a main trunk and one or more branchout groups using woven cable as a basic unit of the assembly.

Another object of the invention is the provision of a simplified wire harness assembly and method of making the same from one or more woven cable units held assembled lengthwise of one another and having one or more groups of conductors of each segregated from the remainder and usable as branchouts from the main body of the harness.

Another object of the invention is the provision of a unique method of separating a woven cable into two parts in a manner utilizing the weft and warp filaments of each group to hold that group securely assembled together.

These and other more specific objects will appear upon reading the following specification and claims and upon considering in connection therewith the attached drawing to which they relate.

Referring now to the drawing in which a preferred embodiment of the invention is illustrated:

FIG. 1 is a plan view of a typical wire harness assembly prior to stripping the ends of the individual conductors for connection to electrical components;

FIG. 2 is a cross-sectional view on an enlarged scale taken along line 2—2 on Figure 1;

FIG. 3 is a plan view of a second embodiment of the invention;

FIG. 4 is an enlarged fragmentary view of the central portion of one of the wire tapes of the wire harness shown in Figure 3; and FIG. 5 is a fragmentary perspective view on an enlarged scale showing the manner in which heat severing of the weft and warp filaments serves to fuse both to adjacent portions of the conductor sheaths. Referring initially and more particularly to FIGS. 1 and 2, there is shown an illustrative embodiment of the invention harness assembly, designated generally 10, comprising a single layer of woven cable 11 the midportion of which comprises the main trunk of the harness assembly. Prior to being processed to provide a harness assembly 10, woven cable 11 consists of 16 conductors 13 each having a flexible wire core 14 (FIG. 2) and a surrounding thermoplastic jacket 15 and held assembled in flat condition. Typically, the conductors are held assembled by thermoplastic weft filaments 17 and longitudinally extending warp filaments 18, there being one of the latter filaments between each pair of conductors 13. It will be understood that customarily both the weft and warp filaments comprise a multiplicity of fine thermoplastic filaments twisted together. Although these warp and weft filaments may be interwoven in various patterns, those shown here, by way of illustration, have a single weft filament 17 interwoven with and crosswise of each conductor and with the warp filaments 18 between adjacent conductors in the manner made clear by FIG. 5.

To form any desired number and length of branchout groups of conductors the workman utilizes a thin, heated blade of good heat-conductive material and inserts it between a pair of conductors separating the desired number of branchout conductors from the remainder of the conductors. This knife is then drawn lengthwise between the conductors at a rate appropriate to sever the weft filaments 17 and to heat fuse the ends of these together, to warp filaments 18, and/or to the plastic jacket of the adjacent conductors. FIG. 5 shows typical fusion joints indicated at 20 between the ends of the filaments as well as with the conductor jackets. The proper temperature and speed of movement of the blade lengthwise of the cable to achieve highly satisfactory results is easily gained after a brief period of experience. It will be understood that the particular filaments in the process of being fused are closely adjacent other filaments not yet reached by the blade and therefore effective to hold the cable conductors snugly assembled. For this reason, there is no strain tending to spread the conductors apart during the fusing operation. Furthermore the pressure of the blade passing between the conductors presses the heat-softened surfaces together thereby materially facilitating and expediting the welding operation.

Proceeding the manner just described, as many branchout groups of conductors A, B, C, D, E, F and G are prepared as are needed to interconnect the various subgroups of electrical components in any particular operating environment. Each branchout includes the required number of conductors and branchouts from the main trunk at the particular location appropriate for that subgroup of components in accordance with customary practice in the construction of a wire harness. Good practice includes wrapping the opposite ends of each branchout with one or two convolutions of friction tape as is indicated at 24 through 34 inclusive to provide an added safeguard against loosening of the conductors in any group and further strengthening the junction of each branchout with the main trunk of the cable. The reinforcing tapes adjacent the ends of the branchouts are usually located sufficiently rearward of the terminal ends as to permit removal of the insulation and the connection of these terminal ends to the electrical equipment.

In the usual case certain connectors of one branchout require electrical connection with a conductor of another branchout. This is readily accomplished in the manner indicated in FIG. 1. For example, let it be assumed that a conductor of branchout A needs to be connected to a conductor of branchout B. This requirement is easily met by severing the weft filaments along a short length of the main trunk of the harness assembly and severing a conductor of each branchout A and B as, for example conductors 36 and 37. A short length of these severed conductors is then pulled outwardly from the main trunk, the insulation is removed and the ends are soldered together and capped as indicated at 38. Likewise the opposite ends of the other conductors are either capped for possible future use or utilized in making connection to conductors of other branches if there is need therefor.

Referring to the bottom of FIG. 1, it will be noted that conductors 40 of branchout D, 41 of branchout C, and conductor 42 of branchout B have been severed, spliced together and capped by cap 43 in a similar manner. As many conductors from different branchout groups or the main trunk itself may be spliced together as may be necessary to meet the requirements of a particular installation.

Referring now to FIGS. 3 and 4, a second preferred embodiment of the invention is disclosed, designated generally 10', and differing from the first described embodiment primarily in that a pair of similar ribbon cables 11', 11" are suitably interconnected lengthwise of one another, as by fastener devices 45, 45 passing through a narrow band of webbing 46 extending lengthwise of the midportion of each cable. It will be noted that cable 11' is substantially wider than cable 11" but this is a matter of designer's choice and varies widely according to the needs of a given installation. Conductors 13', 13" of the two woven cables are held together by weft and warp filaments 17', 18' in the same general manner as described above except that these include a narrow strip interwoven from the weft and warp filaments to provide the tape 46 along the midlength of the cable. This web is useful in securing two or more woven cables to one another. Although the details are not shown, it will be understood that any number and length of branchout may be provided in harness assembly 10' in the same manner illustrated and described in connection with FIGS. 1 and 2. It will also be understood that one or more of the woven cables may be longer or shorter than other of the cables. In other instances, one or more of the woven cables may be employed largely as branchout groups of conductors. In this case the secondary woven cable may extend generally crosswise of the main trunk and its opposite ends may be split to provide separate branchout groups using the invention principles previously described.

While the particular woven cable harness assembly and method of making same herein shown and disclosed in detail is fully capable of attaining the objects and providing the advantages hereinbefore stated, it is to be understood that it is merely illustrative of the presently preferred embodiment of the invention, and that no limitations are intended to the details of construction or design herein shown other than as defined in the appended claims.

I claim:

1. A wire harness assembly having a main trunk comprising a plurality of insulated conductors held assembled in at least one layer with the conductors held in side-by-side parallel relation by warp and weft filaments of thermoplastic material interwoven with one another and with said conductors, said main trunk including at least one branchout group of conductors separated from said main trunk conductors by severed weft filaments, said weft filaments embracing each conductor of said harness assembly and the portions thereof severed from said main trunk to form said branchout group of conductors being heat fused together as an incident of the hot severing thereof whereby the remaining conductors of the main trunk and the branchout group of conductors separated therefrom each remain secured together by weft and warp filaments interwoven with the conductors of each of said groups.

2. A wire harness assembly as defined in claim 1 characterized in that said assembly includes a plurality of said branchout groups of conductors branching out from different portions of said main trunk, and each of said branchouts having the conductors thereof retained securely bound together in flat side-by-side relation by heat-fused junctions between the ends of adjacent ones of the associated weft filaments.

3. A wire harness assembly as defined in claim 2 characterized in the provision of a crossover electrical junction between a conductor of one of said branchouts and a different conductor of said main trunk.

4. A wire harness assembly as defined in claim 3 characterized in the provision of a plurality of crossover electrical junctions between conductors of different ones of said branchout groups of conductors.

5. A wire harness assembly as defined in claim 1 characterized in the provision of a plurality of groups of main trunk conductors each of which groups comprises a single layer of conductors held assembled to one another by an independent set of weft and warp filaments interwoven with an associated group of main trunk conductors, and means holding said groups of main trunk conductors compactly together lengthwise of said harness assembly.

6. That method of converting a flat ribbonlike array of conductors individually sheathed in a thermoplastic jacket and held assembled in side-by-side parallel relation by weft and warp thermoplastic filaments interwoven with the conductors into a wire harness assembly having a main trunk portion and at least one branchout group of conductors which method comprises: passing a heated thin blade lengthwise between a selected pair of said trunk conductors thereby to sever said thermoplastic filaments and heat fuse the same together and to the juxtaposed surface of the adjacent conductor jacket and providing a branchout group of conductors lying beside the remaining group of the main trunk conductors with each group separately held assembled by the associated weft and warp filaments interwoven therewith.

7. That method defined in claim 6 characterized in the step of similarly forming a plurality of independent branchout groups of conductors along selected portions of said ribbonlike array of conductors.

8. That method defined in claim 7 characterized in the steps of securing more than one of said ribbonlike arrays of conductors together lengthwise thereof to provide the main trunk portion of a wire harness, and separating portions of at least one of said ribbonlike array into branchout groups of conductors as desired and as expedient to accommodate the needs of a particular operating environment.

9. That method defined in claim 7 characterized in the step of electrically interconnecting certain of said conductors intermediate the ends of said ribbonlike array of conductors to provide an electrical path between different groups of said conductors.

* * * * *